(12) United States Patent
Hua et al.

(10) Patent No.: US 9,810,531 B2
(45) Date of Patent: Nov. 7, 2017

(54) SYSTEM, IN PARTICULAR A MANUFACTURING SYSTEM

(71) Applicant: SEW-EURODRIVE GMBH & CO. KG, Bruchsal (DE)

(72) Inventors: Zhidong Hua, Karlsruhe (DE); Christoph Steffen Keppler, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 124 days.

(21) Appl. No.: 14/763,691

(22) PCT Filed: Dec. 13, 2013

(86) PCT No.: PCT/EP2013/003777
§ 371 (c)(1),
(2) Date: Jul. 27, 2015

(87) PCT Pub. No.: WO2014/114315
PCT Pub. Date: Jul. 31, 2014

(65) Prior Publication Data
US 2015/0358080 A1    Dec. 10, 2015

(30) Foreign Application Priority Data

Jan. 28, 2013  (DE) .................. 10 2013 001 358

(51) Int. Cl.
*H04B 10/00* (2013.01)
*G01B 11/26* (2006.01)
(Continued)

(52) U.S. Cl.
CPC .............. *G01B 11/26* (2013.01); *G01B 11/00* (2013.01); *G08C 23/04* (2013.01); *H04B 10/116* (2013.01);
(Continued)

(58) Field of Classification Search
CPC ....... G01B 11/26; G01B 11/00; H04L 7/0075; G08C 23/04; H04B 10/1143; H04B 10/116; H04B 10/1125
(Continued)

(56) References Cited

U.S. PATENT DOCUMENTS 9,048,948 B2    6/2015  Paral
2002/0034950 A1  3/2002  Sawada et al.
(Continued)

FOREIGN PATENT DOCUMENTS

DE   10 2010 036 521    1/2012
EP       2 187 178       5/2010
(Continued)

OTHER PUBLICATIONS

International Preliminary Report on Patentability, dated Aug. 6, 2015, issued in corresponding International Application No. PCT/EP2013/003777.
(Continued)

*Primary Examiner* — Juan A Torres
(74) *Attorney, Agent, or Firm* — Andrews Kurth Kenyon LLP

(57) ABSTRACT

A system for an installation and a method for operating a system, including stationary transceiver modules and a vehicle having a transceiver module, the individual transceiver module having a controllable light source and a light sensor, so that a data transmission is able to be carried out between the vehicle and the stationary modules.

16 Claims, 4 Drawing Sheets

(51) Int. Cl.
*G08C 23/04* (2006.01)
*H04B 10/114* (2013.01)
*H04L 7/00* (2006.01)
*H04B 10/112* (2013.01)
*H04B 10/116* (2013.01)
*G01B 11/00* (2006.01)

(52) U.S. Cl.
CPC ..... *H04B 10/1125* (2013.01); *H04B 10/1143* (2013.01); *H04L 7/0075* (2013.01)

(58) Field of Classification Search
USPC ........................................................ 398/107
See application file for complete search history.

(56) References Cited

U.S. PATENT DOCUMENTS

| | | | |
|---|---|---|---|
| 2005/0129410 A1 | 6/2005 | Wilsey et al. | |
| 2008/0292320 A1 | 11/2008 | Pederson | |
| 2008/0304833 A1 | 12/2008 | Zheng | |
| 2009/0245806 A1* | 10/2009 | Murayama | H04B 10/116 398/130 |
| 2009/0310971 A1* | 12/2009 | Kim | H04B 10/1149 398/103 |
| 2010/0054744 A1 | 3/2010 | Maxson | |
| 2010/0118305 A1 | 5/2010 | Siraky et al. | |
| 2011/0069971 A1* | 3/2011 | Kim | H04B 10/116 398/172 |
| 2011/0105134 A1* | 5/2011 | Kim | H04B 10/116 455/450 |
| 2011/0153201 A1* | 6/2011 | Park | G01C 21/20 701/533 |
| 2012/0008959 A1* | 1/2012 | Son | H04B 10/1149 398/99 |
| 2012/0251123 A1 | 10/2012 | Pederson | |
| 2013/0026224 A1* | 1/2013 | Ganick | G01S 1/70 235/375 |
| 2013/0026945 A1* | 1/2013 | Ganick | G01S 1/70 315/246 |
| 2013/0028609 A1* | 1/2013 | Staats | G01S 5/16 398/130 |

FOREIGN PATENT DOCUMENTS

| | | |
|---|---|---|
| JP | 2000028723 A | 1/2000 |
| WO | 2008/148050 A1 | 12/2008 |
| WO | 2012/024247 A1 | 2/2012 |

OTHER PUBLICATIONS

International Search Report, dated Apr. 17, 2014, issued in corresponding International Application No. PCT/EP2013/003777.

* cited by examiner

SYSTEM, IN PARTICULAR A MANUFACTURING SYSTEM

FIELD OF THE INVENTION

The present invention relates to a system for an installation and to a method for operating a system.

BACKGROUND INFORMATION

It is common knowledge that an installation is equipped with illumination means for illuminating the interior space.

SUMMARY

Therefore, the present invention is based on the objective of further developing an installation featuring a contactless data transmission.

Features in the system for an installation include stationary transceiver modules and a vehicle provided with a transceiver module, the individual transceiver module having a controllable light source and a light sensor, so that a data transmission is able to be carried out between the vehicle and the stationary modules.

This has the advantage that the light sources provided for the illumination can also be used for the data transmission. In addition, the data transmission can preferably be implemented in the vertical direction, no obstacles existing for light in this direction. Insensitivity with respect to interference radiators is achievable by modulating the light.

In one advantageous development, the used light is visible light or infrared light. This has the advantage that simple, cost-effective sensors, especially photo diodes or photo transistors, and light sources, in particular LEDs, are usable. Arrays are usable in this context, that is to say, a multitude of electrically interconnected light sources and/or sensors.

In one advantageous embodiment, the data transmission can be carried out bidirectionally. The advantage of this is that a data bus is realizable in a contactless manner.

In one advantageous development, the light cone emitted by an individual module overlaps with the light cone of a further module. This advantageously makes it possible to achieve a higher resolution when ascertaining the position.

In one advantageous development, the vehicle has a memory in which the positions of the stationary modules and/or the zones assigned to the positions, i.e., position regions, are stored, the stationary modules in each case transmitting identifying information to the vehicle, so that the vehicle ascertains the stored position or the assigned zone from the identifying information of the stationary module. This has the advantage that as a result of the received identifying information, the transmitter is ascertainable and, by means of the map, its position together with the light cone as well. This makes it possible to ascertain a position region in which the vehicle is located. In an overlap of the transmission cones of multiple transmitters, higher resolution is achievable, that is to say, a more precise position region is able to be ascertained.

In one advantageous development, each module differs having two polarization foils, with polarization directions that differ, the first polarization foil covering a first controllable light source and a first light sensor, and the second polarization foil covering a second controllable light source and a second light sensor. This is advantageous insofar as the orientation of the vehicle is able to be detected in a simple manner.

In one advantageous development, a means for ascertaining the orientation is situated in a stationary manner and/or on the vehicle, the means in particular including an evaluation means to which the signals from a first and a second light sensor are supplied. This has the advantage that the orientation is ascertainable on the basis of the polarized radiation.

In one advantageous embodiment, the light intensity of an individual controllable light source is modulated for the data transmission, in particular at a frequency between 100 kHz and 10 MHz. This has the advantage that the human eye can see only the illumination, and a high data transmission rate is achievable at the same time.

In one advantageous development, the stationary controllable light sources also function as illumination of the installation. This is advantageous insofar as the transmission means for the data transmission may simultaneously be used as illumination means as well.

In one advantageous development, the module situated on the vehicle is located on the upper surface of the vehicle. This has the advantage that no obstacles are present between transmitter and receiver in the vertical direction.

In one advantageous development, the stationary controllable light sources are supplied from an electrical cable, which has a first current component for the energy supply of the light sources and a second current component, which is modulated at a higher frequency than the frequency of the first current component, the cable being connected to a central control. This is advantageous insofar as signal transmission lines can be saved.

Important features in the method for operating a system are that data are transmitted between a vehicle and a stationary module, using light modulation, and/or a synchronization signal is transmitted from all stationary modules simultaneously, in particular for vehicles or stationary machines, each vehicle and machine including a light sensor for detecting the light emitted by one or more controllable light source(s) of the individual module.

This has the advantage that data and the synchronization coil are transmittable in an uncomplicated manner, in particular to vehicles and stationary machines.

In one advantageous development, a stationary module outputs polarized light, and a means for ascertaining the polarization direction of the light is disposed on the vehicle, the means including a first light sensor, which is situated under the cover of a first polarization coil, and a second light sensor, which is situated under the cover of a second polarization foil, the first and second polarization foils having different polarization directions. This has the advantage that the orientation of the vehicle in relation to a zero direction, e.g., the north direction, can be determined in a rapid and uncomplicated manner.

In one advantageous development, after the vehicle has entered the sensitive region of the sensor of a stationary transceiver module, in particular after the vehicle has entered the position region of the vehicle that is able to be illuminated by the light cone of this transceiver module, and after the light emitted by the controllable light source of the transceiver module of the vehicle has been detected by the sensor situated on the stationary transceiver module, the controllable light source of the stationary transceiver module is controlled in such a way that at least the position region is illuminated, in particular with or without a modulation of the light emitted by the stationary transceiver module. This has the advantage that the environment of each vehicle is illuminated and the particular zones, i.e., the position regions that can be covered by a light cone and in which no vehicle is situated, will not be illuminated, so that energy is able to be saved.

Further advantages are derived from the dependent claims. The present invention is not restricted to the feature combination of the claims. Those skilled in the art will discover additional meaningful combination possibilities of claims and/or individual claim features and/or features of the specification and/or of the figures, that arise from the stated objective and/or the objective resulting from a comparison with the related art, in particular.

DETAILED DESCRIPTION

Figure 1:
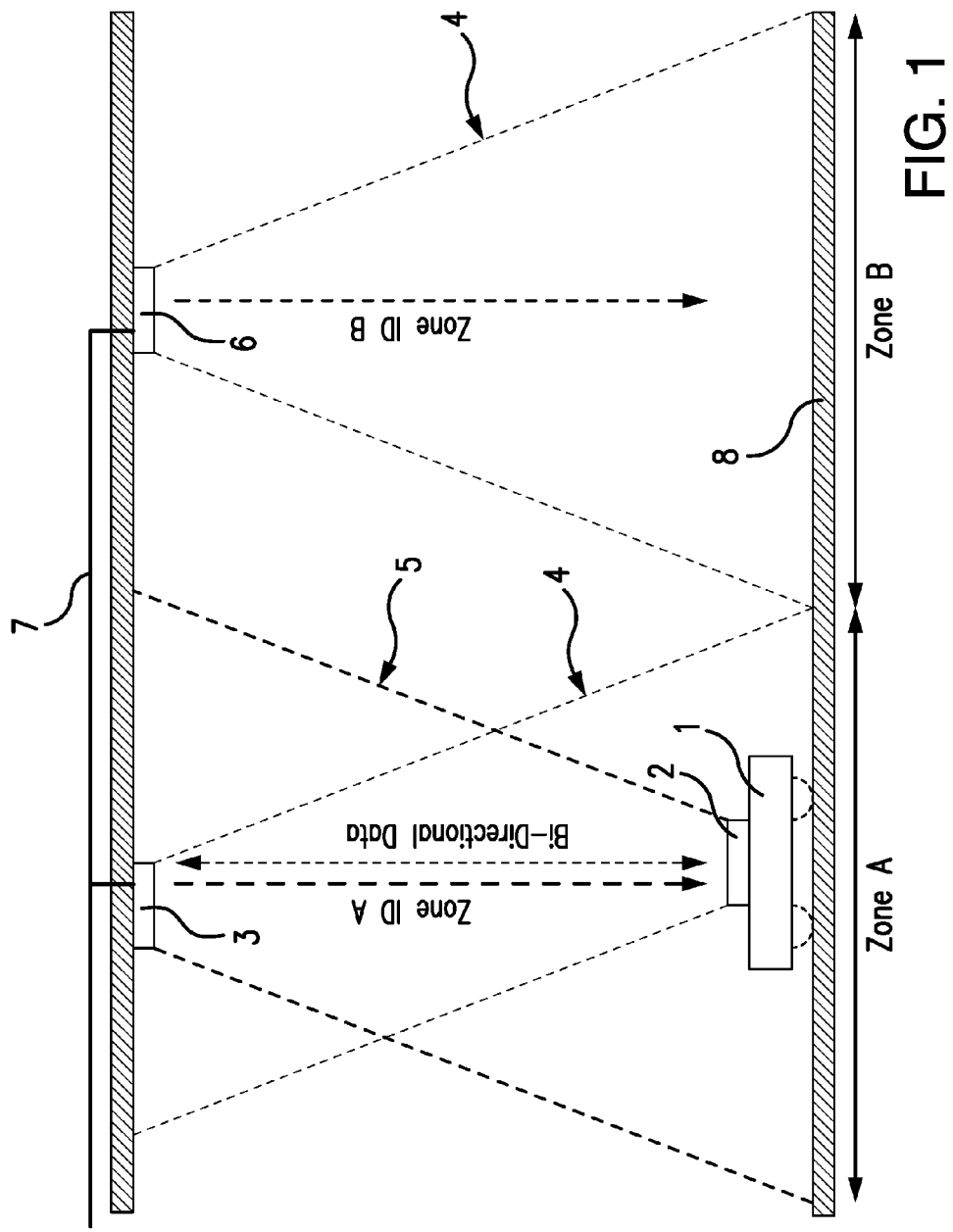
FIG. 1 shows a schematic side view of an installation according to the present invention, including vehicle 1.

As illustrated in FIG. 1, the installation has a floor 8 including a maneuvering area, on which a vehicle 1 is able to be moved.

On its upper side, vehicle 1 has a transceiver module, which includes a controllable light source 2 on the one hand, and a light sensor on the other. The light source and the sensor operate on the basis of either infrared light or visible light. This transmission cone is denoted by reference numeral 5.

The top side of the interior space of the installation is equipped with transceiver modules, each of which has a controllable light source 3 and also a light sensor.

The region that is able to be illuminated by the particular light source, i.e., the transmission cone, is indicated by reference numeral 4.

By appropriate control of light sources 3 and by modulation of the intensity of the emitted light induced thereby, a bidirectional data exchange is able to be carried out by light which is modulated in its intensity, especially visible light or infrared light.

In addition, identifying information, i.e., information about the identity of the radiating light source, is able to be radiated by the individual light source as well.

By analyzing the received information, that is to say, in particular also the detection of the identity of the radiating light source, with the aid of the signal electronics disposed on the vehicle, the position of the vehicle, i.e., the zone illuminated by the transmission cone, is able to be detected. As a result, the resolution in this position determination is only on the order of magnitude of the extension of the zones illuminated by the light sources. An even better resolution is achievable if an overlap of transmission cones 4 exists, because it can be differentiated between the overlap region of two adjacent zones and the region irradiated by only one of the light sources (3, 6).

The light sources are supplied via a cable 7, which not only carries electrical energy, but also includes the data to be transmitted, in that current components of higher frequency than the particular frequency used for the energy supply of the light sources are employed. The light sources, including their control electronics which generate corresponding control signals, are switched electrically in parallel and supplied by way of cable 7.

As an alternative, each light source (3, 6) is supplied directly from a central control using a cable and thus does not require any electronics system that generates control signals. As a result, the light intensity radiated by the individual light source is proportional to the voltage supplied by the central control.

In a similar manner, a data transmission from vehicle 1 to a stationary light sensor disposed at the light source (3, 6) is made possible. That is to say, the light radiated by controllable light source 2 is received by the light sensor, and the received signals are transmitted to the central control via a data transmission channel and/or via cable 7.

The controllable light sources (3, 6) are controlled in such a way that a first light source (3, 6) radiates light during a first time segment, and a second light source radiates light during a subsequent time segment. Even the same modulation frequency of the light is detectable in this manner.

The modulation frequency for the transmission of information lies between 0.5 MHz and 5 MHz.

When visible light is used, the interior space of the installation is illuminated by the stationary light sources (3, 6), in particular. Thus, the illumination means of the installation are used for the data transmission as well.

A synchronization pulse, which is transmitted by all of these stationary controllable light sources (3, 6) at the same time, can be output with the aid of the stationary controllable light sources (3, 6). As a result, multiple machines are operable in a synchronous manner, e.g., the machines can be started in synchrony and are brought to their setpoint rotational speed according to an rpm run-up ramp. This is important, for example, in the case of a conveyor belt having multiple drives or when multiple vehicles 1 of a similar design execute a shared transportation task. In each case the drives or vehicles 1 once again include the previously described light sensors.

That is to say, not only a data transmission but also the transmission of a synchronization pulse is able to be carried out.

Figure 2:
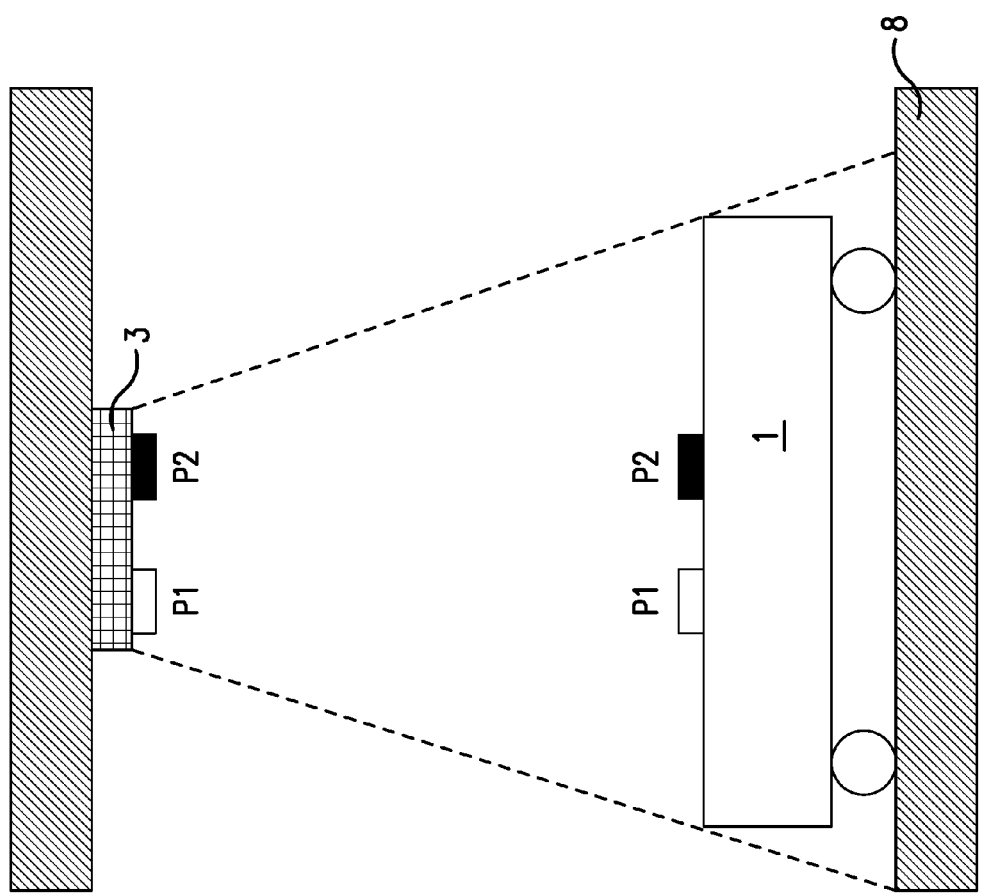
FIG. 2 shows a cut-away portion of a schematic side view of a further installation according to the present invention, including another vehicle 1.

As schematically sketched in FIG. 2, in a further exemplary embodiment according to the present invention, the controllable light sources (2, 3, 6), i.e., the stationary light sources (3, 6) and the light source 2 situated on the vehicle, are developed in duplicate in each case, the first light source being at least partially covered by first polarization foil P1, and the second being at least partially covered by second polarization foil P2. The polarization direction of polarization foil P1 has a perpendicular orientation in relation to the polarization direction of polarization foil P2. In a control of the first light source, light is therefore able to be radiated at a different polarization direction than in a control of the second light source.

Along with the respective first and second light sources (2, 3, 6), a first light sensor associated with the corresponding transceiver module, and a second light sensor are likewise covered by the polarization foils. First polarization foil P1 covers not only the respective first light source, but also the respective first light sensor, and second polarization foil P2 not only covers the respective second light source but the respective second light sensor of the transceiver module as well.

Figure 4:
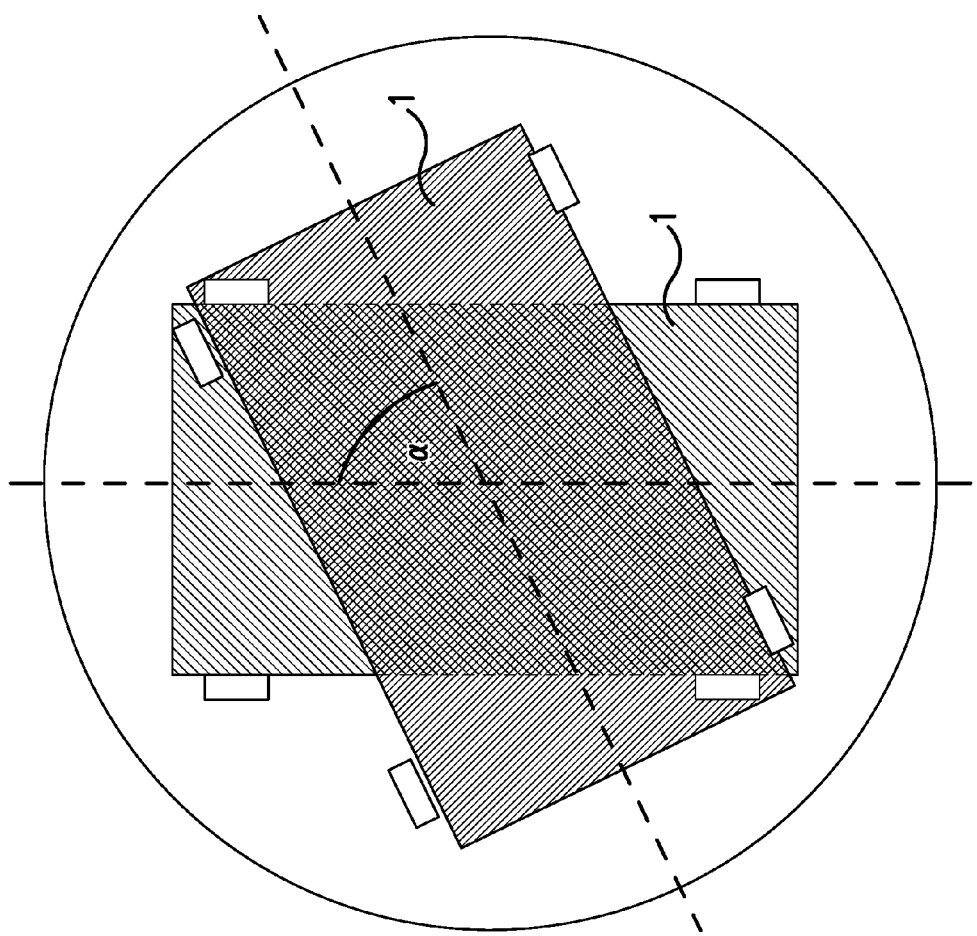
FIG. 4 shows a schematic plan view of the vehicle in two angle-of-rotation states, which are rotated relatively to each other by angle of rotation α.

As illustrated in FIG. 4, the orientation of vehicle 1 in the maneuvering plane is characterizable by an angle of rotation α. This angle is measured with reference to the north direction.

Figure 3:
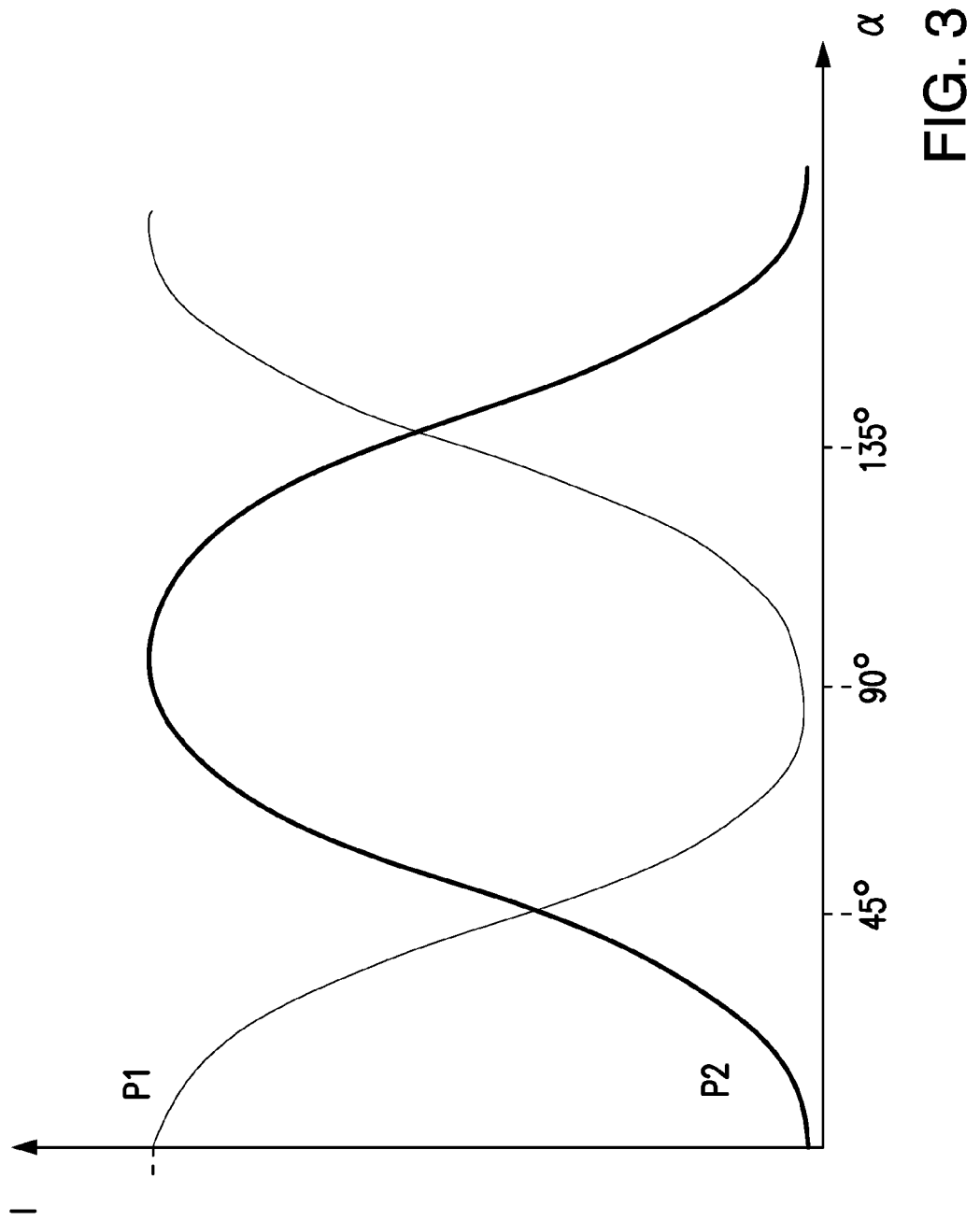
FIG. 3 illustrates the dependency between light intensity I and the angle of rotation of vehicle 1.

As shown in FIG. 3, the light sensors are utilized for measuring an intensity value, which is a function of angle of rotation α, and the signals from the first and second light sensors have an angular displacement of 90° relative to each other, the first light sensor being disposed underneath polarization foil P1 and the second light sensor being disposed underneath polarization foil P2.

In other words, if the individual first light source of controllable light source 3 emits light, the polarization direction of this emitted light is defined by polarization foil P1. The orientation of the vehicle is able to be determined with the aid of the light intensity values detected by the first and second light sensors, which are situated on the vehicle, the characteristic curves according to FIG. 3 preferably being used for this purpose.

Polarization foils P1 and P2 are disposed essentially in parallel with each other.

To improve the measuring accuracy of the orientation, the particular first light source of controllable light source 3 is switched off following a time interval, and the second light source of the controllable light source is switched on. The orientation then is once again determined according to the characteristic curve in FIG. 3.

While determining the orientation, an additional modulation of the light source also makes it possible to transmit information at the same time.

For the data transmission from the vehicle to the stationary central control, the first controllable light source of the vehicle, situated behind polarization foil P1, is controlled, and the generated light is detected by the first light sensor, which is situated behind polarization foil P1 of transceiver module 3, and detected by the second light sensor, which is situated behind polarization foil P2 of the same transceiver module 3. As a result, a data transmission is once again able to take place and, simultaneously, even a determination of the orientation of the vehicle from the direction of the stationary side. The results of the determination of the vehicle orientation are therefore transmittable, and the statistical errors in the determination are able to be reduced by a mean value generation. In so doing, the orientation values measured from the direction of the vehicle and the orientation values measured from the direction of the stationary side are therefore combined as well.

Vehicle 1 is developed as a driverless transport system (FTS) and/or as an automated guided vehicle (AGV).

In another exemplary embodiment according to the present invention, a further position detection system is available in addition, so that higher resolution is achievable in the aforementioned position determination with the aid of illumination zones.

LIST OF REFERENCE NUMERALS 1 vehicle
2 controllable light source
3 controllable light source
4 transmission cone
5 transmission cone
6 controllable light source
7 cable
8 floor with maneuvering area
P1 first polarization filter
P2 second polarization filter
I light intensity
α angle of rotation

The invention claimed is:

1. A system for an installation, comprising:
   stationary transceiver modules; and
   a vehicle having a transceiver module, wherein each transceiver module has a controllable light source and a light sensor, so that a data transmission is able to be carried out between the vehicle and the stationary transceiver modules;
   wherein:
      each module has two polarization foils, with polarization directions that differ,
      a first polarization foil covers a first controllable light source and a first light sensor, and
      a second polarization foil covers a second controllable light source and a second light sensor.

2. The system as recited in claim 1, wherein a light from the transceiver modules is visible light or infrared light.

3. The system as recited in claim 1, wherein the data transmission is able to be carried out bidirectionally.

4. The system as recited in claim 1, wherein a light cone emitted by one of the stationary transceiver modules overlaps with a light cone of a further one of the stationary transceiver modules.

5. The system as recited in claim 1, wherein:
   each stationary transceiver module has an arrangement for controlling the controllable light source, and
   after the vehicle has entered a sensitive region of a sensor of a first one of the stationary transceiver modules, the sensitive region corresponding to a position region that is able to be covered by the light cone of the first stationary transceiver module, and after a light emitted by the transceiver module of the vehicle has been detected with the aid of the sensor disposed on the first stationary transceiver module, the arrangement for controlling the controllable light source controls the light in such a way that at least the position region is illuminated.

6. The system as recited in claim 1, wherein:
   the vehicle includes a memory in which at least one of positions of the stationary transceiver modules and zones assigned to the positions are stored, and
   each stationary transceiver module transmits identifying information to the vehicle, so that the vehicle ascertains one of the stored position and the assigned zone from the identifying information of the stationary transceiver module.

7. The system as recited in claim 1, further comprising:
   an arrangement for ascertaining an orientation situated at least one of in one of the stationary transceiver modules and on the vehicle.

8. The system as recited in claim 1, wherein a light intensity of an individual controllable light source is modulated for the data transmission.

9. The system as recited in claim 1, wherein stationary controllable light sources of the stationary transceiver modules serve as illumination for the installation.

10. The system as recited in claim 1, wherein the module situated on the vehicle is disposed on a top side of the vehicle.

11. The system as recited in claim 1, wherein stationary controllable light sources of the stationary transceiver modules are supplied from an electrical cable, the electrical cable having a first current component for an energy supply of the light sources and a second current component that is modulated at a higher frequency than a frequency of the first current component, the electrical cable being connected to a central control.

12. The system as recited in claim 7, wherein the arrangement for ascertaining the orientation includes an evaluation arrangement to which signals from a first light sensor and a second light sensor are supplied.

13. The system as recited in claim 8, wherein the light intensity is modulated using a frequency between 100 kHz and 10 MHz.

14. A method for operating a system for an installation that includes stationary transceiver modules and a vehicle having a transceiver module, wherein each transceiver module has a controllable light source and a light sensor, so that a data transmission is able to be carried out between the vehicle and the stationary transceiver modules, the method comprising at least one of:

transmitting data between the vehicle and one of the stationary transceiver modules using light modulation; and transmitting a synchronization signal simultaneously from all stationary transceiver modules, for vehicles or stationary machines, each vehicle and machine having a light sensor for detecting the light emitted by one or more controllable light source(s) of the individual module;

wherein:

polarized light is transmitted by a stationary transceiver module, and an arrangement for ascertaining a polarization direction of the polarized light is situated on the vehicle, the arrangement including a first light sensor, which is situated under a cover of a first polarization foil, and a second light sensor, which is situated under a cover of a second polarization foil, the first and second polarization foils having different polarization directions.

15. The method as recited in claim 14, wherein after the vehicle has entered a sensitive region of the sensor of a first stationary transceiver module, after the vehicle has entered a position region that is able to be illuminated by a light cone of the first stationary transceiver module, and after a light emitted by the controllable light source of the transceiver module of the vehicle has been detected by the sensor situated on the first stationary transceiver module, the controllable light source of the first stationary transceiver module is controlled in such a way that at least the position region is illuminated.

16. The method as recited in claim 15, wherein the position region is illuminated with or without a modulation of the light emitted by the first stationary transceiver module.

* * * * *